United States Patent
Behmenburg et al.

(10) Patent No.: US 7,802,776 B2
(45) Date of Patent: Sep. 28, 2010

(54) PNEUMATIC SPRING DAMPER UNIT

(75) Inventors: Christof Behmenburg, Lauenau (DE); Heinz Job, Neustadt (DE); Jens-Uwe Gleu, Langenhagen (DE); Christian Hilger, Isernhagen (DE)

(73) Assignee: Continental Aktiengesellschaft, Inc., Hannover (DE)

( * ) Notice: Subject to any disclaimer, the term of this patent is extended or adjusted under 35 U.S.C. 154(b) by 609 days.

(21) Appl. No.: 11/792,788

(22) PCT Filed: Nov. 22, 2005

(86) PCT No.: PCT/EP2005/012476

§ 371 (c)(1),
(2), (4) Date: Jun. 11, 2007

(87) PCT Pub. No.: WO2006/061098

PCT Pub. Date: Jun. 15, 2006

(65) Prior Publication Data

US 2008/0093782 A1   Apr. 24, 2008

(30) Foreign Application Priority Data

Dec. 11, 2004  (DE) .................. 10 2004 059 764

(51) Int. Cl.
    F16F 9/04   (2006.01)
(52) U.S. Cl. .............. 267/64.24; 267/64.21; 267/64.19; 267/64.23; 188/298
(58) Field of Classification Search ............. 267/64.24, 267/64.21, 64.19, 64.23, 64.27, 122, 124; 188/298
See application file for complete search history.

(56) References Cited

U.S. PATENT DOCUMENTS

| | | | |
|---|---|---|---|
| 3,046,003 A | | 7/1962 | Schultz |
| 4,493,481 A | * | 1/1985 | Merkle .................... 267/64.27 |
| 4,518,154 A | * | 5/1985 | Merkle ........................ 267/34 |
| 4,854,555 A | | 8/1989 | Ohkawa |
| 5,180,145 A | * | 1/1993 | Watanabe et al. ......... 267/64.24 |
| 5,996,980 A | * | 12/1999 | Frey et al. ................ 267/64.27 |
| 6,536,749 B1 | * | 3/2003 | Luhmann et al. ......... 267/64.19 |
| 6,749,046 B2 | * | 6/2004 | Luncz ........................ 188/314 |
| 6,782,979 B1 | | 8/2004 | Gold |
| 6,817,597 B1 | * | 11/2004 | Thurow et al. .............. 267/122 |
| 6,827,341 B2 | * | 12/2004 | Bank et al. ............... 267/64.21 |
| 7,213,799 B2 | * | 5/2007 | Behmenburg et al. .... 267/64.24 |

(Continued)

FOREIGN PATENT DOCUMENTS

DE          24 06 835        8/1975

(Continued)

*Primary Examiner*—Robert A Siconolfi
*Assistant Examiner*—Mariano Sy

(57) ABSTRACT

Disclosed is a pneumatic spring shock absorber unit having working chambers (2, 3), which are filled with compressed air and which are partially delimited by rolling or folding bellows (7, 8, 9). These working chambers are situated one above the other and are interconnected via throttle valves that can be flowed through. Both working chambers are located inside a common pot-shaped housing (4) and are separated by a piston (6) so that one working chamber (2) is located on the front side of the piston and the other working chamber (3) is located on the rear side of the piston and at least partially surrounds the piston rod (5) so that the piston and the piston rod are sealed and guided inside the housing by rolling bellows (7, 8, 9).

9 Claims, 1 Drawing Sheet

U.S. PATENT DOCUMENTS

| | | |
|---|---|---|
| 2003/0066405 A1 | 4/2003 | Harrison |
| 2004/0124571 A1 | 7/2004 | Gold |
| 2004/0201146 A1 | 10/2004 | Behmenburg |
| 2008/0223671 A1 * | 9/2008 | Gleu .......................... 188/298 |

FOREIGN PATENT DOCUMENTS

| | | |
|---|---|---|
| DE | 10224868 B3 | 3/2004 |
| DE | 10311263 B3 | 7/2004 |
| FR | 1299215 A | 7/1962 |

* cited by examiner

PNEUMATIC SPRING DAMPER UNIT

BACKGROUND OF THE INVENTION

The invention relates to a pneumatic spring and damper unit, in particular for chassis of vehicles, which is arranged between the vehicle body and chassis and has at least two working spaces which are filled with compressed air, in which pneumatic spring and damper unit the working spaces are each at least partially bounded by movable walls in the form of rolling bellows or corrugated bellows, and the rolling or corrugated bellows roll at least partially on the contours of rotationally symmetrical bodies (rolling contours), preferably on housing parts which are embodied as cylindrical surfaces, the working spaces being arranged one on top of the other and being connected to one another by means of throttle valves through which there can be a flow, and in which pneumatic spring and damper unit in the case of spring compression in the main loading direction the volume of one working space is decreased and the volume of the other working space is increased or remains unchanged.

DE 103 11 263 B3 2004 Jul. 29 presents a pneumatic spring with pneumatic damping, two working chambers and three rolling bellows being provided. The rolling bellows which is the largest in diameter determines here the spring rate of the pneumatic spring over the spring travel and is arranged between an upper and a lower pot-shaped housing part. The two further bellows which compensate one another in their effective spring force are arranged between the lower pot-shaped housing part and a rolling tube which is attached within the upper pot-shaped housing part and projects into the lower pot-shaped housing part. Air can flow between the two working spaces via throttle bores in the cylindrical walls of the rolling tube. In this embodiment, the two lower bellows which are arranged in mirror-inverted fashion permit axial guidance of the pneumatic spring, which largely reduces the friction during the spring travel. However, in this system the volume of the two working chambers is decreased in the case of spring compression and increased again in the case of spring extension. As a result of the decrease in the two volumes in the case of spring compression, the pressure, and thus the gas density, increase in the two working chambers, but the dynamic pressure difference at the throttle valves disadvantageously does not increase. This in turn brings about a level of energy conversion which is only slightly increased even at a relatively high pressure, i.e. relatively little dissipation and thus less damping work.

U.S. Pat. No. 5,180,145 discloses a damper which operates in particular with an electro-rheological fluid and has an upper and a lower working space which are each partially bounded by rolling bellows. The damper permits a relatively large degree of travel despite the reduced overall height, and in an embodiment which is disclosed in said document it can also be combined with a simple pneumatic spring whose single working space is also partially bounded toward the outside by a rolling bellows. However, the combination of dampers and springs which operate with respectively different media increases the complexity and thus the cost of the component. In addition, the recycling of, in particular, electro-rheological fluids gives rise to possible problems in the life cycle management.

DE 34 36 664 A1 discloses a diaphragm pneumatic spring which also provides suspension and damping and has two working chambers of different sizes, which are each partially bounded toward the outside by rolling bellows. The rolling bellows are supported and roll here on external cylinder surfaces of housing parts which are axially movable and embodied as hollow pistons. The working chambers which are of different sizes are separated by a wall which is provided with throttle openings. Air can flow from one working chamber into the other through the throttle openings, the resulting dissipation producing the damping work. However, in the basic design of the diaphragm pneumatic spring, in which the housing parts which are embodied as hollow pistons are connected to a central rod which is guided in the separating wall, said diaphragm pneumatic spring is subject to considerable friction losses in this guidance. As a result, inter alia, a minimum force is necessary which has to be reached in order to start-up the spring/damper system in the first place. Below such a minimum force, all the vibrations are transmitted in an undamped and unsprung fashion. A further embodiment, shown there, in which the rigid connecting rod which is guided in the separating wall is replaced by an external frame is virtually unusable in cardanic suspensions, in particular of vehicles, due to its overall size.

The German laid-open patent application DE 24 06 835 discloses a suspension and damping device in which two working spaces, specifically a damper space and a suspension space, are connected to one another via throttle valves. The two working spaces are bounded at least partially by movable walls in the form of corrugated bellows or rolling bellows and can therefore accommodate different volumes. In contrast to the air spring disclosed in DE 103 11 263 B3 2004 Jul. 29, in the case of spring compression the volume of the suspension space is reduced here and the volume of the damper space increased, and the reverse respectively applies in the case of spring extension. Inherent to such a system is the fact that the damping effect/damping work increases as the load increases, while normal hydraulic damping is designed for just one load stage and changes (decreases) acutely if, for example, the load is increased. However, if the load increases in the suspension and damping device disclosed in the German laid-open patent application DE 24 06 835, the gas pressure in the suspension space and in the damping space rises and leads, owing to the associated increase in the gas density, to an increase in the dynamic pressure difference at the throttle valves. This in turn brings about an increased conversion of energy, i.e. increased dissipation and thus greater damping work. A disadvantage here is also a perceptible degree of friction in the system of all the embodiments presented, as a result of which, inter alia, a minimum force becomes necessary to activate the spring, damper system.

DE 101 15 980 discloses a pneumatic spring damper unit with a piston which can be displaced in a cylinder housing, is sealed with respect to the latter and separates two working spaces. In this context, the suspension space or spring damper space which lies on the front side of the piston becomes smaller in the case of spring compression. The damper space which is located on the rear side of the piston and includes the piston rod is increased in the case of spring compression, and vice versa. The damper space is partially bounded toward the outside by a rolling bellows. The throttle valves which are located in the piston are configured here in such a way that a different flow resistance is present depending on the direction of throughflow, and the location of the changeover from laminar flow to turbulent flow is adapted. The problem of friction is also not sufficiently solved here by the guidance of the piston in the cylinder.

The same applies to the device disclosed in DE 199 32 717 A1, which is similar in terms of the basic design. Here too, there is a pneumatic spring, damper unit with a sealed piston which can be displaced in a cylinder housing and separates two working spaces. The suspension space or spring damper space located on the front side of the piston becomes smaller in the case of spring compression, while the damper space which is located on the rear side of the piston and contains the piston rod becomes larger in the case of spring compression, and vice versa. The damper space is partially bounded toward the outside by a rolling bellows. The throttle valves which are located in the piston are configured here as valves which are loaded with spring disks, the spring disks and valve cross sections being embodied as a function of the through-flow direction.

For the invention, the object has therefore been to make available a pneumatic spring and damper unit whose overall spatial volume is small and is also suitable, for example, for a passenger car, which can be installed without additional structural expenditure in the installation space of conventional suspension and damping devices, which does not have any friction—in particular has no dry friction—which can lead to acoustic problems or requires a minimum force to activate the spring, damper system, and which, finally, operates with just one medium and can be configured for different load situations by simple measures.

SUMMARY OF THE INVENTION

This object is achieved by means of the following features: The working spaces of the pneumatic spring and damper unit according to the invention are arranged within a common, pot-shaped, rotationally symmetrical housing and are divided by a rotationally symmetrical piston which is axially movable within the housing and is located at the head end of a piston rod, with the result that a working space is arranged at the front side of the piston and the other working space is arranged on the rear side of the piston and partially surrounds the piston rod. The piston and the piston rod are each sealed and guided by rolling bellows within the rotationally symmetrical housing, and the external surface of the piston and of the piston rod and the internal surface of the housing are each embodied at least partially as rotationally symmetrical rolling contours.

Such a pneumatic spring and damper unit has a low overall size even under high loads and avoids any perceptible friction through the separation and sealing of the piston and the piston rod in each case by rolling bellows within the rotationally symmetrical housing and ensures immediate and comfortable "starting". In addition, the arrangement within a single common pot-shaped rotationally symmetrical housing permits encapsulation which is facilitated compared to raw ambient conditions, for example by means of corrugated bellows between the cylindrical housing and piston rod or connecting points.

One advantageous embodiment consists in the fact that a first rolling bellows which provides a seal with respect to the front side of the piston and a second rolling bellows which provides a seal with respect to the rear side of the piston are arranged between the piston and housing, and in that a third rolling bellows which is spaced apart from the piston is arranged between the piston rod and housing.

An embodiment with three bellows which are arranged in such a way permits precise and reliable guidance of the piston and of the piston rod, that is to say of the part of the pneumatic spring and damper unit connected to the chassis for example, within the pot-shaped cylindrical housing, which is then connected to the vehicle body. As a result, even transverse forces acting on the pneumatic spring and damper unit, i.e. chassis forces which are normal to the axis of the pneumatic spring and damper unit, can be transmitted, which is possible only to a limited degree with conventional pneumatic spring damping systems.

A further advantageous embodiment consists in the fact that the first rolling bellows which seals the front side of the piston is open toward the front side of the piston and that the second rolling bellows which seals the rear side of the piston, and the third rolling bellows between the piston rod and rotationally symmetrical housing, are open toward the rear side of the piston. With such an embodiment, the rolling bellows which are located on the piston are therefore arranged in a mirror-inverted fashion with respect to one another and use at least partially the same rolling contour on the external surface of the piston, which in turn significantly reduces the overall size.

A further advantageous embodiment consists in the fact that the first and second rolling bellows have identical effective diameters, their effective diameters being advantageously larger than the effective diameter of the third rolling bellows.

If the working spaces which are located one on top of the other and are produced by such an arrangement of the rolling bellows in the pneumatic spring and damper unit according to the invention and the "effective diameters" which are determined by the rolling bellows geometry are considered, the first and second rolling bellows which are located on the piston essentially compensate one another in their direction and magnitude of force in the steady state, that is to say when there is static, loading of the pneumatic spring and damper unit and pressure equalization between the two working chambers. As a result, the effective bearing spring is formed through interaction between the components using the third rolling bellows and its bearing force is also determined by the effective diameter of the third rolling bellows.

In a good approximation, the working space which is located on the rear side of the piston and surrounds the piston rod and is bounded, inter alia, by the second and third rolling bellows, is therefore to be considered to be a "suspension space". In contrast, the working space which is located on the front side of the piston and bounded, inter alia, by the first rolling bellows can be referred to as a "damping space". However, such a simplifying division of the working spaces into "suspension space" and "damping space" describes only the main functions and the essential properties. It goes without saying, both working spaces have both suspension properties and damping properties in the dynamic state.

In the pneumatic spring and damper unit according to the invention, in contrast to the previously known pneumatic damping systems, the volume of the damping space is therefore reduced in the case of spring compression in the main loading direction, specifically in the axial direction of the pneumatic spring and damper unit, while—depending on the structural interpretation—the volume of the suspension space increases or remains unchanged.

The volumes which are formed in this way and the diameters which are effective for the rolling bellows produce a large damping work relative to the overall size, or maintain, the size of the desired damping work with a reduced overall spatial volume.

A further advantageous embodiment consists in the fact that the external surface of the rotationally symmetrical piston is embodied at least partially as a cone envelope, and the first and second rolling bellows have different effective diameters. Special advantages are obtained if the effective diameters of the first and second rolling bellows are respectively larger than the effective diameter of the third rolling bellows. As a result of the difference in area (circular ring area) arising in this way and formed by the different effective diameters of the first and second rolling bellows, a differential force which acts on the piston and can be adjusted in the direction and magnitude of force can be produced, with which differential force it is possible to correspond to particular requirements in terms of loading or geometry of the system as a whole.

This can be advantageously implemented by virtue of the fact that the effective diameter of the first rolling bellows is smaller than the effective diameter of the second rolling bellows. The resulting differential force thus additionally acts in the loading direction, that is to say counter to the spring force generated by the third rolling bellows, thus "pulls" the piston deeper into the top-shaped cylindrical housing and attempts to shorten the pneumatic spring and damper unit. This can be counteracted by a higher operating pressure or by an increase in the third rolling bellows, that is to say by increasing the effective diameter of the third rolling bellows. The latter measure gives rise to a larger diameter in the continuously moved rolling bellows corrugation and thus to a considerable lengthening of the service life. This embodiment of the pneumatic spring and damper unit therefore permits a variety of structural adaptations and degrees of freedom without changing the overall size, accompanied by the largest possible use of the "identical component principle", i.e. by using as many as possible identical components for a large number of design variants.

A further advantageous embodiment consists in the fact that the pot-shaped, rotationally symmetrical housing can preferably be attached fixed to the vehicle body in the upper region, and the piston rod can preferably be attached to a wheel suspension in the lower region. As a result, in particular when the pneumatic spring and damper unit is used in chassis of passenger cars, it is located in a protected fashion in the wheel house and in most installation situations it fits excellently into the installation space (package) which is provided for it.

A further advantageous embodiment consists in the fact that the throttle valves through which there can be a flow are embodied as switchable or controllable valves and are arranged within the rotationally symmetrical piston which separates the working spaces. In particular, when they are applied in chassis of motor vehicles it is desirable to perform open-loop or closed-loop control of the damping work and thus also integrate it into the entire vehicle control system. In situations which are critical in terms of safety such as, for example, in the case of full braking, an antilock brake system (ABS) or an electronic stability program (ESP) can then support adjustable damping of the front and rear axles.

The invention will be explained in more detail by means of an exemplary embodiment.

DETAILED DESCRIPTION OF THE DRAWING

Figure 1:
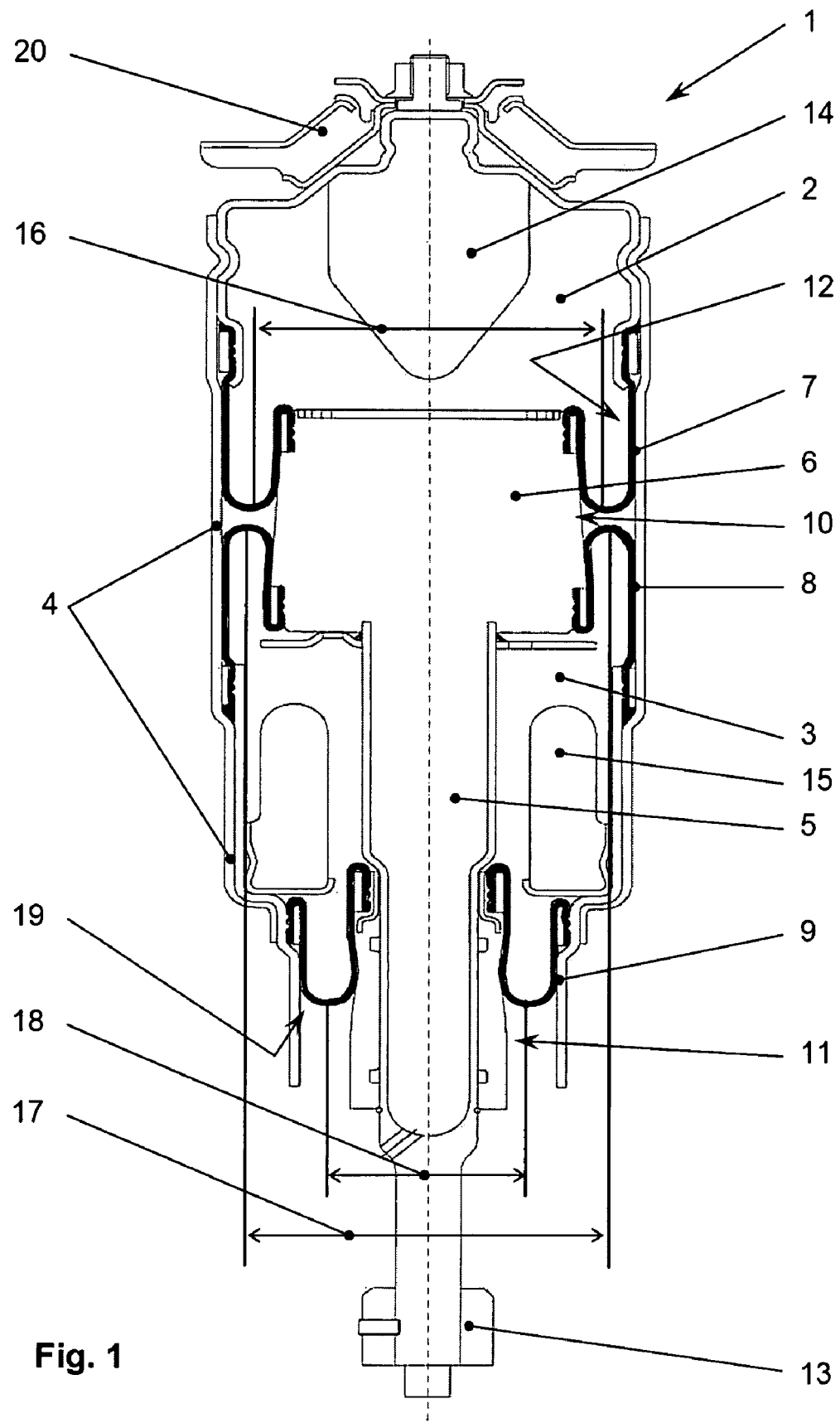
FIG. 1 shows a pneumatic spring and damper unit according to the invention for a chassis of a passenger car with pneumatic suspension.

The pneumatic spring and damper unit 1 has two working spaces 2 and 3 which are filled with compressed air. The compressed air is fed in a known fashion into the working spaces via a compressor (not illustrated here in more detail) through associated valves and lines and can also be let out via this system. A pneumatic spring system or ride level control system is usually composed of a compressed air system/compressed air supply and four pneumatic spring modules, namely one for each wheel, and is controlled in its entirety by means of a control device.

The working spaces 2 and 3 are arranged in a common pot-shaped housing 4—of cylindrical design here—and separated by a piston 6 which is located at the head end of a piston rod 5 and is rotationally symmetrical in design. The piston 6 is axially movable within the cylindrical housing 4. Controllable throttle valves (not illustrated here in more detail) by means of which the two working spaces 2 and 3 are connected are arranged within the piston 6. The piston 6 and the piston rod 5 are each sealed and guided by means of rolling bellows 7, 8, and 9 within the cylindrical housing. The external surfaces 10 and 11 of the piston and of the piston rod as well as the internal surface 12 of the cylinder are each embodied as rotationally symmetrical rolling contours across an area which is necessary for the rolling of the rolling bellows.

A corrugated bellows which is located between the end of the cylindrical housing and the lower connecting point 13 to the chassis and which has the purpose of protecting against environmental conditions is not represented here in more detail.

The pneumatic spring and damper unit also has stops 14 and 15 which are of sprung design and which, given corresponding loading, limit the piston travel/spring travel at the compression stage end point or at the extension stage end point, so that metallic contact does not occur.

The external surface of the rotationally symmetrical piston 6 is embodied as an upwardly tapering cone envelope. As a result, the first rolling bellows 7 and the second rolling bellows 8 have different effective diameters 16 and 17 which are each larger than the effective diameter 18 of the third rolling bellows 9. The effective diameter of the first rolling bellows 16 is smaller than the effective diameter 17 of the second rolling bellows. As a result of the different effective diameters 16 and 17 a differential surface (circular ring surface) is produced which acts on the piston and generates an upwardly directed differential force.

The respectively effective diameters are formed and influenced here by the interplay of the rotationally symmetrical contours, lying opposite one another, of the piston 6 and of the housing 4.

The differential force thus "pulls" the piston deeper into the pot-shaped housing. However, the third rolling bellows 9 has an effective diameter 18 which is made so large that the differential force can be absorbed in addition to the static or dynamic loading. However, as a result the third rolling bellows 9 also has a relatively large radius in the continuously moved rolling corrugation 19 and thus a very high load cycle endurance.

The pneumatic spring and damper unit is connected to the vehicle at the vehicle body end in a known fashion by means of a strut unit head bearing 20.

LIST OF REFERENCE NUMERALS (Part of Description)
1 Pneumatic spring and damper unit
2 Working space (damper space)
3 Working space (suspension space)
4 Cylindrical housing
5 Piston rod
6 Piston
7-9 Rolling bellows
10-12 Surface with rolling contour
13 Connecting point
14, 15 Sprung stop
16-18 Effective diameter
19 Corrugated bellows
20 Strut unit head bearing

The invention claimed is:

1. A pneumatic spring and damper unit, which is arranged between a vehicle body and a chassis and has at least two working spaces filled with compressed air, each working space being at least partially bounded by a rolling bellows, each rolling bellows rolling at least partially on the contours of a rotationally symmetrical body the working spaces being arranged one on top of the other and being connected to one another by means of throttle valves through which there can be a flow of air, the pneumatic spring and damper unit having a main load direction in which the pneumatic spring and damper unit is compressed, the volume of one working space is reduced, and the volume of the other working space is increased or remains unchanged, wherein the two working spaces (2, 3) are arranged within a rotationally symmetrical housing (4) and are separated by a rotationally symmetrical piston (6) with a front side and a rear side, which piston is axially movable within the housing (4) and is located at a head end of a piston rod (5), with the result that one working space (2) is arranged on the front side of the piston and at least one other working space (3) is arranged on the rear side of the piston and partially surrounds the piston rod (5), wherein the piston (6) and the piston rod (5) are each sealed and guided by means of rolling bellows (7, 8, 9) within the housing (4), and in that the external surface (10, 11) of the piston (6) and of the piston rod (5) and the internal surface (12) of the housing are each embodied at least partially as rotationally symmetrical rolling contours.

2. The pneumatic spring and damper unit according to claim 1, wherein a first rolling bellows (7) which provides a seal with respect to the front side of the piston and a second rolling bellows (8) which provides a seal with respect to the rear side of the piston are arranged between the piston (6) and rotationally symmetrical housing (4), and in that a third rolling bellows (9) which is spaced apart from the piston (6) is arranged between the piston rod (5) and rotationally symmetrical housing (4).

3. The pneumatic spring and damper unit as claimed in claim 2, wherein the first rolling bellows (7) which seals the front side of the piston is open toward the front side of the piston, and in that the second rolling bellows (8) which seals the rear side of the piston and the third rolling bellows (9) between the piston rod (5) and housing (4) are open toward the rear side of the piston.

4. The pneumatic spring and damper unit as claimed in claim 3, wherein the first and second rolling bellows (7, 8) have essentially the same effective diameters (16, 17).

5. The pneumatic spring and damper unit as claimed in claim 3, wherein the external surface of the rotationally symmetrical piston (6) is embodied at least partially as a cone envelope, and the first and second rolling bellows (7, 8) have different effective diameters (16, 17).

6. The pneumatic spring and damper unit as claimed in claim 5, wherein the effective diameter (16) of the first rolling bellows (7) is smaller than the effective diameter (17) of the second rolling bellows (8).

7. The pneumatic spring and damper unit as claimed in claim 3, wherein first rolling bellows (7), the second rolling bellows (8), and the thrid rolling bellows (9) each have an effective diameter (16, 17, 18), wherein the effective diameter (16) of the first rolling bellows (7) and the effective diameter (17) of the second rolling bellows (8) are each larger than the effective diameter (18) of the third rolling bellows (9).

8. The pneumatic spring and damper unit as claimed in claim 1, wherein the housing (4) has an upper region which is adapted to be fixed to a vehicle body and wherein the piston rod (5) has a lower region which is adapted to be attached to a wheel suspension.

9. The pneumatic spring and damper unit as claimed in claim 1, wherein the throttle valves through which there can be a flow of air are embodied as switchable or controllable valves and are arranged within the piston which separates the working spaces.

* * * * *